United States Patent
Cui et al.

(10) Patent No.: US 12,451,738 B2
(45) Date of Patent: Oct. 21, 2025

(54) SOFT MAGNETIC WIRE/STRIP ARRAY FOR MOTOR STATOR AND ROTOR

(71) Applicants: Iowa State University Research Foundation, Inc., Ames, IA (US); UT-Battelle, LLC, Oak Ridge, TN (US)

(72) Inventors: Jun Cui, Ames, IA (US); Gaoyuan Ouyang, Ames, IA (US); Iver E. Anderson, Ames, IA (US); Matthew Kramer, Ankeny, IA (US); Tsarafidy Raminosoa, Gilbert, IA (US)

(73) Assignees: Iowa State University Research Foundation, Inc., Ames, IA (US); UT-Battelle, LLC, Oak Ridge, TN (US)

( * ) Notice: Subject to any disclaimer, the term of this patent is extended or adjusted under 35 U.S.C. 154(b) by 302 days.

(21) Appl. No.: 18/445,032

(22) Filed: Mar. 13, 2023

(65) Prior Publication Data
US 2023/0327501 A1  Oct. 12, 2023

Related U.S. Application Data

(60) Provisional application No. 63/372,497, filed on Mar. 15, 2022.

(51) Int. Cl.
H02K 1/02 (2006.01)
(52) U.S. Cl.
CPC ..................................... H02K 1/02 (2013.01)
(58) Field of Classification Search
CPC .. H02K 1/02; H02K 1/04; H02K 1/12; H02K 1/22
USPC .................................................. 310/216.006
See application file for complete search history.

(56) References Cited

U.S. PATENT DOCUMENTS

| | | | | |
|---|---|---|---|---|
| 4,255,684 | A * | 3/1981 | Mischler | H02K 1/141 310/216.096 |
| 6,960,860 | B1 * | 11/2005 | DeCristofaro | H02K 15/022 310/216.113 |
| 7,888,839 | B2 * | 2/2011 | Gabrys | H02K 21/24 310/140 |
| 9,391,499 | B2 * | 7/2016 | Kim | H02K 3/524 |
| 10,193,430 | B2 * | 1/2019 | Müller | H02K 21/16 |
| 10,355,537 | B2 * | 7/2019 | Zhu | H02K 1/2766 |
| 10,559,990 | B2 * | 2/2020 | Hosek | H02K 3/28 |
| 10,570,494 | B2 * | 2/2020 | Hosek | H01F 1/24 |
| 2014/0265647 | A1 * | 9/2014 | Muller | H02K 21/16 310/12.24 |

(Continued)

FOREIGN PATENT DOCUMENTS

| | | |
|---|---|---|
| EP | 2523311 | 1/2013 |
| JP | 3038798 | 5/2000 |
| JP | 2018007304 A * | 1/2018 |

(Continued)

OTHER PUBLICATIONS

Translation of foreign document JP 2021069268 A (Year: 2021).*

(Continued)

*Primary Examiner* — Alex W Mok

(57) ABSTRACT

A novel architecture for al motor rotor and stator of an electrical motor device as well as other electromagnetic device using soft magnetic wires and/or strips bundled and shaped to provide a desired magnetic flux path.

19 Claims, 5 Drawing Sheets

(56) References Cited

U.S. PATENT DOCUMENTS

2020/0036271 A1*  1/2020  Kies .................... H02K 16/04
2021/0066983 A1*  3/2021  Mcsheery ............. H02K 1/145

FOREIGN PATENT DOCUMENTS

JP        2021069268 A  *  4/2021
WO    WO 2014-057841       4/2014

OTHER PUBLICATIONS

Gaoyang Ouyang et al, Journal of Magnetism and Magnetic Materials, 481, pp 234-250, 2019.
Jagadeesh K. Tangudu et al, IEEE, pp. 2236-2243, 2011.

* cited by examiner

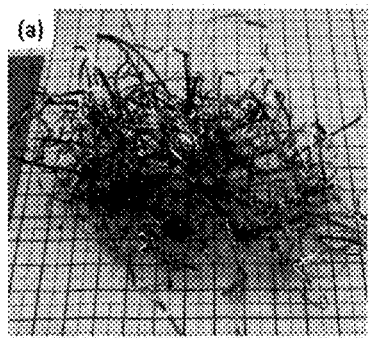 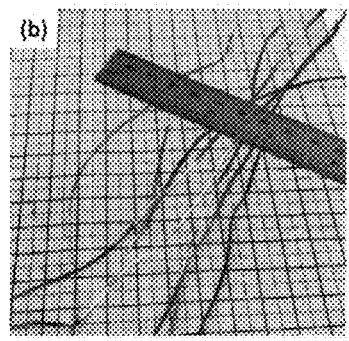 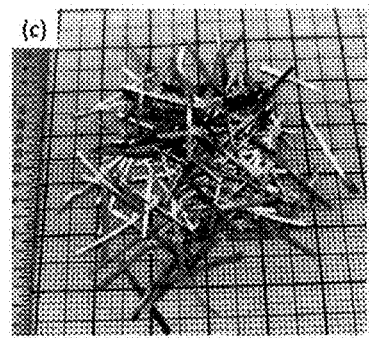
Fig. 3a  Fig. 3b  Fig. 3c
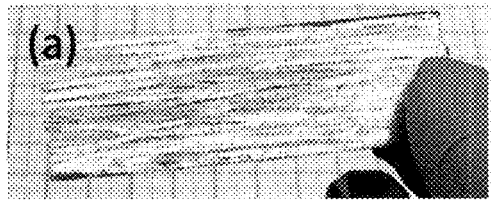 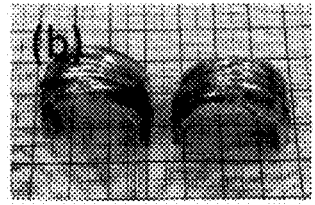 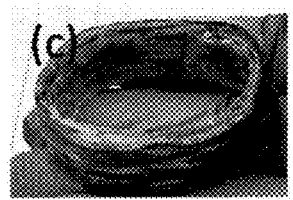
Fig. 4a  Fig. 4b  Fig. 4c
Fig. 4d
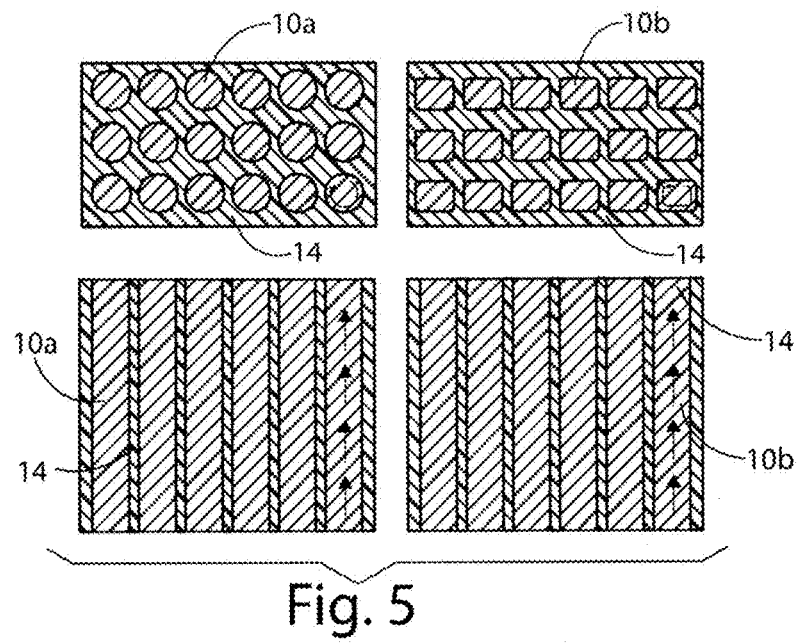
Fig. 5

| Sample | Ribbon thickness (mm) | wheel speed (m/s) | Sample thickness (mm) | status | Hc 1T (A/m) | DCµMax 1T | DC coreloss 1T (H=800A/M) (J/m³) | B8 (Tesla) | B25 (Tesla) | B50 (Tesla) | W10/60 (W/kg) | W10/400 (W/kg) | W5/1k (W/kg) | W2/5k (W/kg) | W1/10k (W/kg) |
|---|---|---|---|---|---|---|---|---|---|---|---|---|---|---|---|
| Fe-3.2Si sheet | — | n/a | 0.35 | GOSi-Steel | 9.3 | 12690 | 34.84 | 1.74 | 1.88 | 1.94 | 0.85 | 16.9 | 21 | 56.1 | 52.9 |
| Fe-6.5Si ribbon bundle | 0.025 | 20 | 0.33 | AS+CR | 159.9 | 1032 | 650.1 | 0.66 | 0.95 | n/m | n/m | 36.7 | 30.7 | 33.2 | 17.6 |
| Fe-6.5Si ribbon bundle | 0.025 | 20 | 0.49 | AS+CR+A N | 43.4 | 3848.5 | 187.4 | 1.16 | 1.31 | 1.43 | 1.5 | 11.1 | 8.8 | 11.8 | 7.3 |
| Fe-6.5Si ribbon bundle | 0.025 | 20 | 0.3 | AS+CR+A N+AGE | 43.1 | 4921.1 | 189.8 | 1.15 | 1.29 | 1.41 | 1.47 | 11 | 8.1 | 12.2 | 7 |

GOSi Steel: Grain oriented silicone steel; W10/60: loss as B=1T, f=60Hz,
AS: 20 m/s as spun; CR: cold roll (30.5% reductions); AN: 1100°C 2 annealing; AGE: 650°C ordering aging; N/M: not measured

Fig. 6

SOFT MAGNETIC WIRE/STRIP ARRAY FOR MOTOR STATOR AND ROTOR

CONTRACTUAL ORIGIN OF THE INVENTION

This invention was made with government support under Grant No. DE-AC-02-07CH11358 and Grant No. DE-AC05-00OR22725 awarded by the U.S. Department of Energy. The government has certain rights in the invention.

FIELD OF THE INVENTION

The present invention relates to the field of electric motors. More particularly, this invention relates to the topology and arrangement of advanced soft magnetic materials in the fabrication of a motor stator or rotor.

BACKGROUND OF THE INVENTION

The market of electric vehicles (EV) is rapidly expanding; some government has implemented ambitious plans to replace all internal combustion engine vehicles with EV. On top of the government initiative, a healthy growth of EV market relies on further development of its electric drive system and traction motor to gain increased power and range. In the electrical and Electronics Tech Team Roadmap, US DOE has set the targets for the electric traction motor for 2025 as improving the power density by 8× to 50 kW/L while reducing the cost by 30% to 3.3 \$/kW compared with the 2020 numbers.

The electric drive of an EV consists of electric motor, electronics, transmission, and battery. The electric motor is mainly made of rotor, stator, winding, housing, shaft, and cooling system. Depending on the motor type, the rotor or the stator, or both, is a collection of soft magnetic materials (SMM) and insulating materials. Using advanced SMM and improved thermal management techniques, the power density and thermal stability of the electric motor can be greatly improved without sacrificing the system efficiency.

The selection of advanced SMM with high saturation boosts the power rating of the electric motors. However, since the SMM is constantly subject to alternating magnetic fields, the efficiency of the motor can be impaired if not adequately managed. The most significant energy loss of SMM is the eddy current losses caused by the induced currents on changing magnetic fields, and eddy current losses increase with frequency. Therefore, increasing power density by increasing motor speed is only useful when the eddy current loss can be minimized. Using a 30 kW motor as an example, if the speed is increased to 15,000 rpm from its rating of 10,000 rpm, the power output may increase to 45 kW, but the efficiency will be reduced to about 90% from the original 94% due to the increased eddy current loss [reference 1].

The current motor industry uses a segmentation strategy to reduce eddy current loss by using thinner SMM laminates. However, as we make the SMM sheet thinner for even higher operating frequency, the SMM packing density and magnetic flux density will be reduced as the insulating coating is already at its minimum thickness. For example, in a typical stator, the SMM laminate is about 0.4 mm, and the insulating coating on both sides is about 8 μm. Further reducing SMM laminate thickness to 0.1 mm while keeping the insulation layer constant will lead to a non-active volume exceeding 10%. With the typical engineering approach exhausting to its practical limit, the best solution for maintaining low core loss at high speed is to use an alternative SMM with electric resistance much higher than the currently most popular 3.2% Si steel ($\rho$=57 μΩ-cm). There are efforts underway to use advanced SMM such as an amorphous alloy (Metglas Fe78Si9B13) or nanocrystalline alloys (Nanoperm Fe88B4Zr7Cu1, $\rho$=120 μΩ-cm, etc.) for motor applications. Unfortunately, these advanced SMM materials' inherently brittle nature makes it extremely difficult to fabricate laminates and assemble them to produce a motor. Moreover, the use of a large amount of expensive glass-forming elements such as B, Nb, Zr, Cu causes higher cost and diluted magnetization. High silicon electric steel offers relatively high resistivity ($\rho$=82 μΩ-cm), high magnetization and low cost, but it also suffers from brittleness problem [reference 2] unlike amorphous or nanocrystalline alloys as a result ordering experienced by crystalline high silicon electric steel. Embodiments of the present invention involve mitigating this brittleness problem by rapid quenching techniques such as melt spinning as described below.

SUMMARY OF THE INVENTION

Certain embodiments of the present invention provide an electric motor stator and/or rotor comprising a plurality of individual wires and/or strips comprised of soft magnetic material and disposed in arrays (shapes) to form desired stator or rotor magnetic flux pathways for boosting the magnetic field generated by copper windings and serving as pole pieces to conduct and focus magnetic flux. The wires and/or strips can be coated with electrical insulating material that may also serve as a binder for subsequent molding of the stator or rotor.

Certain embodiments provide a stator or rotor that can comprise multiple stator segments or multiple rotor segments each being a bundle of a plurality of wires and/or strips wherein these segments can be disposed and joined in side-by-side arrangement to form a complete stator or rotor.

In certain embodiments of the present invention, the soft magnetic wires and/or strips comprise rapidly solidified wires or strips including, but not limited to, at least one of high silicon steel, amorphous soft magnetic material, and nanocrystalline soft magnetic material.

The present invention envisions an electric motor that includes a stator or rotor as described above.

Moreover, the present invention envisions a component that includes a plurality of individual soft magnetic material wires and/or strips bundled to fit desired magnetic flux pathways for the particular component service application wherein the component includes, but is not limited to a motor rotor or stator, transformer core, or power electronics components such as an inductor or choke.

BRIEF DESCRIPTION OF THE DRAWINGS

FIG. 3a is a photographic image of as-melt spun high silicon steel strips; FIG. 3b is a photographic image of soft magnetic strips straightened by cold rolling; and FIG. 3c is a photographic image of high silicon (6.5 weight % Si) steel strips truncated to length.

FIG. 4a is a photographic image of the high silicon steel strip bundle bonded by epoxy in the form of a rectangular prism having dimensions of 50 mm×20 mm×1 mm, FIG. 4b is a photographic image of two U-shape segments, FIG. 4c is a a photographic image of a toroid which was cut in half to form the two U-shape segments of FIG. 4b, and FIG. 4d is a schematic line representation of the rectangular prism of FIG. 4a.

FIG. 5 is a schematic illustration showing a wire bundle iron core and a strip bundle iron core pursuant to embodiments of the present invention wherein the top row are schematic cross-sectional views of respective wire and strip bundles while the bottom row are schematic plan views with the binder partially removed to reveal the wires or strips.

FIG. 6 includes a magnetic property table showing lower electrical energy loss of Fe-6.5 w/o Si strip (ribbon) bundles in accordance with embodiments of the invention compared to that of a Fe-3.2 w/o Si sheet sample of commercial grain oriented silicon steel (GOSi-steel). In the table, DC max is maximum permeability in direct current testing condition; DC coreless is coreloss (hysteresis) in direct current testing condition; B8, B25 and B50 are magnetic flux densities at particular magnetic fields (the value listed times 100 in A/m (e.g B8 is the magnetic flux density at 800 A/m magnetic field; and Hc is coercive field in A/m.

DETAILED DESCRIPTION OF THE INVENTION

Figure 1:
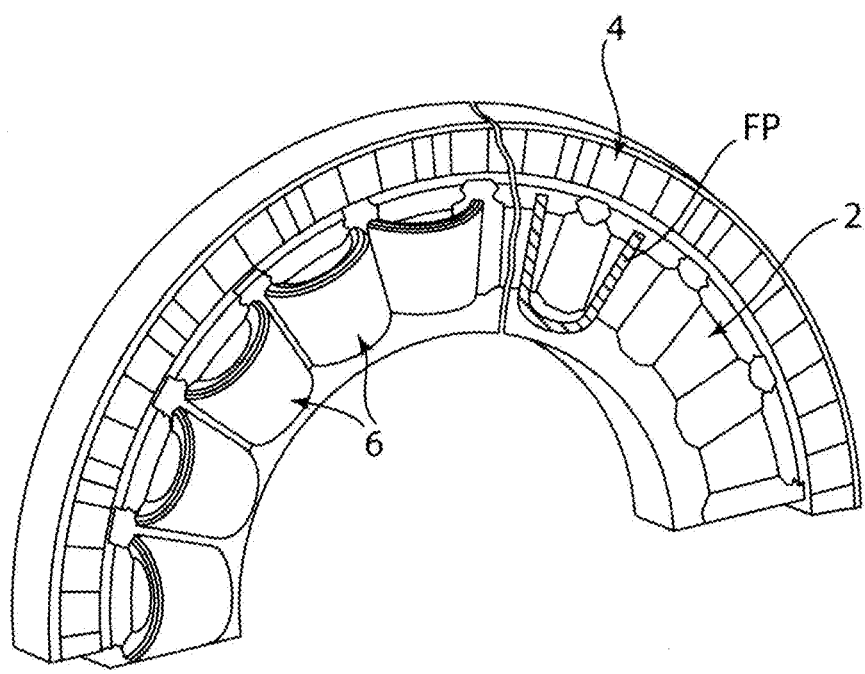
FIG. 1 shows a magnetic flux line or path present at peak torque condition for a conventional outer rotor surface-mount permanent magnet and inner stator motor design (shown schematically). The U-shaped magnetic flux line or path is a typical magnetic flux line present in the stator (copper winding partially broken away in FIG. 1 to show the magnetic flux line).

One of the essential components of an electric vehicle is the electric motor. To increase the power and range of electric vehicles, the electric motor's power density and energy efficiency have to be improved. Soft magnetic materials (SMM) used in the electric motor's iron core, whether in the form of rotor or stator, boost and guide the magnetic field generated by the copper windings wherein the core serves as pole-piece to focus magnetic flux. Currently, iron cores are made by stacking, laminates tightly along the motor axial direction. Each laminate is a monolithic piece, with slots punched to accommodate either permanent magnets or for winding wires. Due to the magnetization saturation limit, the area near the magnets or winding wires is saturated while the rest of the laminate is not. This effect of magnetic flux concentration leaves large areas of laminate under-utilized, reducing the power density of the motor.

To address the above-noted deficiencies, certain embodiments of the present invention employ at least one of ductile soft magnetic wires 10a and strips 10b (i.e. wires or strips or a combination of wires and strips described hereafter as wires and/or strips) to assemble the iron core wherein the elongated wires and/or strips are bent or otherwise shaped to collectively create ideal magnetic flux pathways. Referring to FIG. 5, wires 10a can have a circular cross-section (e.g. diameter) or other curvilinear cross-section and strips 10b can have a rectangular or other flat sided cross-section. The term "strip" includes, but is not limited to, strip, ribbon, tape, band, or other similar elongated shapes.

If round wires 10a are produced and employed, the wire diameter can range from 0.01 to 1 mm; and the length can range from 1 mm to 5000 mm. If strips 10b are produced and employed, the thickness can range from 0.01 mm to 1 mm; the width can range from 0.01 mm to 100 mm; and the length can range from 1 mm to 5000 mm.

An illustrative embodiment of the present invention forms a plurality of stator or rotor segments 12 each of which includes a plurality of SMM wire and/or strip bundles 10 and then joins the segments to form a complete stator or rotor. The SMM wires and/or strips bundles 10 can be bonded together, mechanically joined by fastening elements, or otherwise joined in a manner to form a respective bundle. The segments can have a U-shape or other shape to provide beneficial magnetic flux paths for the motor. Alternately, a plurality of the SMM wires and/or strips can be formed first to provide a toroid shape, which is then cut in half to form two U-shaped wire and/or strip bundle stator (or rotor) segments that can be joined to fabricate the stator (or rotor).

In a still further embodiment, free (unbonded) SMM wires 10a and/or strips 10b can be placed in a stator or rotor fixture having cavities with a desired stator or rotor tooth shape. The cavities can then be filled or sprayed with a binder material to join the wires and/or strips as a bundle, or the fixture can be made of a material, such as skrink wrap plastic, that can be shrink-wrapped onto the free SMM wires and/or strips to form a complete stator or rotor.

In practicing an illustrative embodiment of the invention, the wires 10a and/or strips 10b are coated with electrical insulator binder material, before or after being bent or otherwise shaped, and then bonded together into a horseshoe shape (U-shape) or other shape conforming tightly around a motor pole. The insulating binder can organic or inorganic material that can include but are not limited to, epoxy resin; silicone resin; phenolic resin; silicate; fluoride, oxide and others. The shaped bundles (stator or rotor segments), however formed, then are bonded side-by-side radially or otherwise into a stator (or rotor) cylinder or disk, FIGS. 2 and 2B. The U-shaped wire and/or strip bundle design in accordance with certain embodiments of the invention is beneficial to effectively use the magnetic flux generated by the stator or rotor copper winding and also to provide spaces for cooling channels.

The properties and the arrangement of the SMM wires 10a and/or strips 10b of the bundle 10 play a role in determining the energy density and energy efficiency of the electric motor. Advanced SMM alloys such as high silicon electrical steel (e.g. comprising greater than 3.2 weight % Si and balance essentially Fe and other optional alloying elements such as B, Nb, Zr, Cu and others) as well as Fe—B electrical steels and others having high saturation magnetization and high electrical resistivity (electrical resisivity ρ greater than about 60 μΩ-2-cm such as about 80 μΩ-cm or more) can satisfy this requirement. However, the conventional material processing and motor assembly technique cannot be applied directly to advanced SMM as they are brittle. Rapid solidification can overcome the brittleness issue and prepare ductile SMM. Certain embodiments of the present invention employ soft magnetic wires and/or strips comprise rapidly solidified wires or strips including, but not limited to, at least one of high silicon steel, amorphous soft magnetic material, and nanocrystalline soft magnetic material. Besides, the subsequent stamping and lamination can be cost-ineffective for SMM tapes. In contrast, wires and strips are the most common material form produced from rapid solidification techniques such as melt spinning. Certain embodiments of the invention involve the use of high silicon steel (electrical resisivity ρ of about 82 μΩ-cm) and other SMM's wires and/or strips for making iron core for electric motors. Such motors can include, but not limited to, radial or axial gapped AC or DC motors, self-communtated or externally communtated motors, induction motors, permanent magnet motors, synchronous or switched reluctance motors.

FIG. 1 illustrates a typical magnetic flux path FP present in a conventional, commonly used radial flux motor where it can be seen that the stator 2 guides and enhances the magnetic flux lines generated by the copper windings 6 shown in the figure. Bounded by the saturation of the SMM and Gauss's law for magnetism, the magnetic flux lines are concentrated near the permanent magnet rotor 4 and the copper windings 6. Current conventional stator design uses a stacked monolithic steel laminates design where the magnetic property is the same everywhere in each laminate. The effect of magnetic flux concentration leaves large areas of laminate under-utilized, reducing the power density of the motor.

Figure 2:
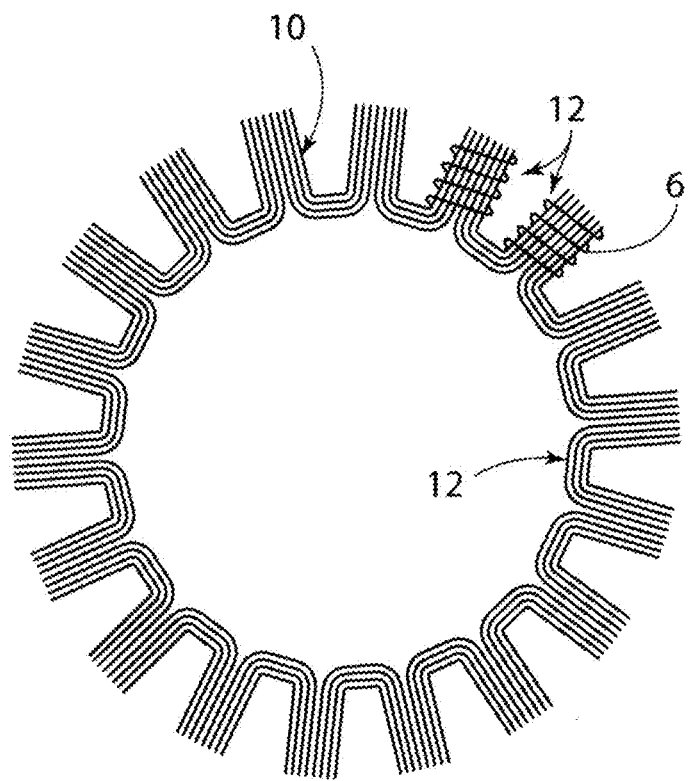
FIG. 2 is a schematic front elevational view of a stator comprised of multiple wire and/or strip bundles in accordance with an illustrative embodiment of the present invention, with stator windings shown for some stator teeth.

FIG. 2 schematically illustrates an embodiment of the present invention that addresses the above-noted deficiency by using the U-shape wire and/or strip bundle design as stator or rotor segments 12 in accordance with embodiments of the invention, wherein more effective use is made of the magnetic flux generated by the stator or rotor copper winding and also leaves spaces for cooling channels.

Figure 2A:
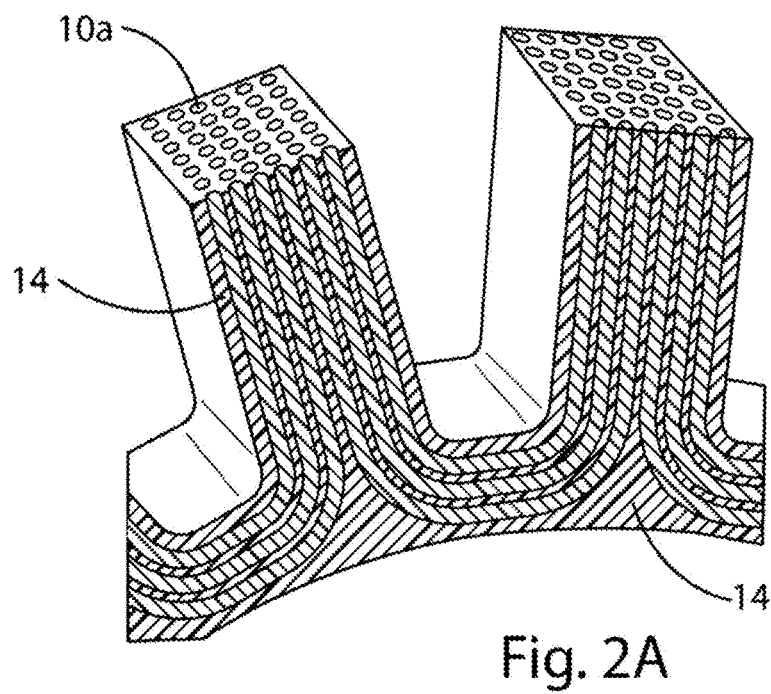
FIG. 2A is a schematic partial perspective view showing a stator segment (two pole pieces) highlighting the orientation of the SMM (soft magnetic material) wires/strips. The SMM wires or strips are shown disposed in matrix represents of electrical insulation material or binder.
Figure 2B:
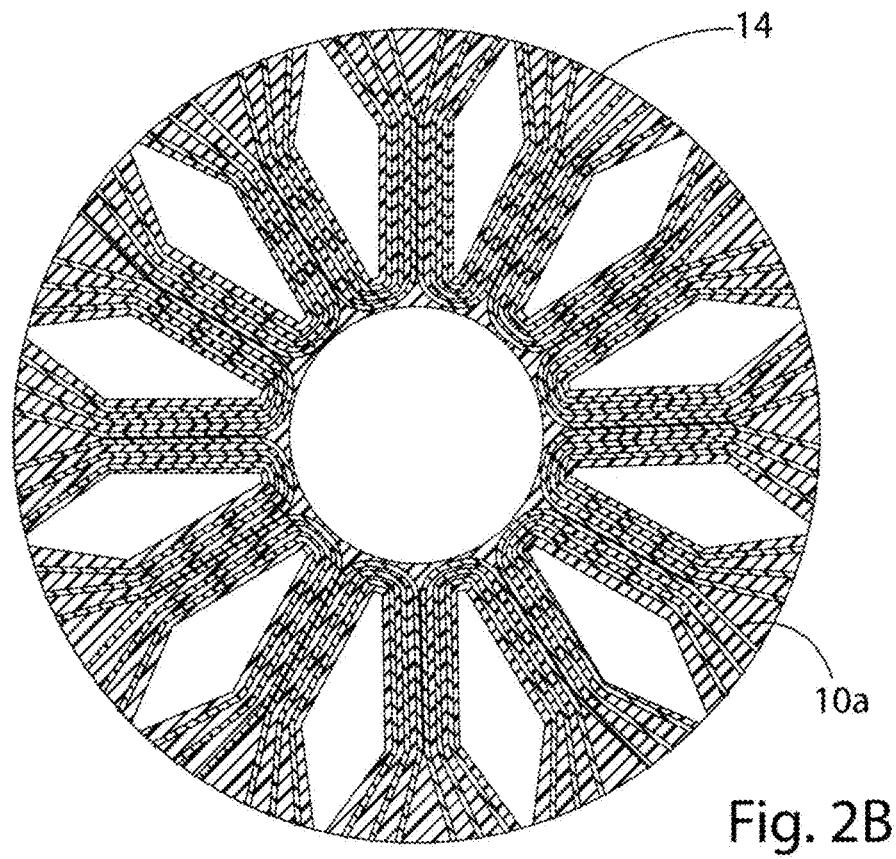
FIG. 2B is a schematic view of another embodiment of a stator that is comprised of individual segments shown schematically in FIG. 2C.
Figure 2C:
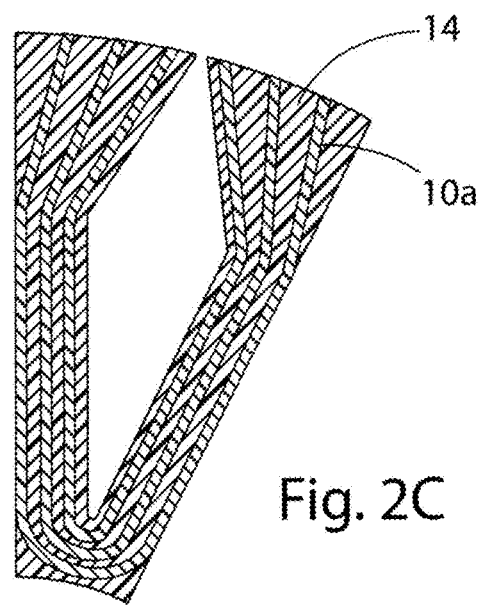

In particular, in an illustrative embodiment, the ductile SMM wires 10a and/or strips 10b are treated to have an insulating coating and truncated to the desired length before they are bent to create ideal magnetic flux pathways needed in a motor stator. Alternately, as mentioned above, a plurality of continuous SMM wires and/or strips can be wound or otherwise shaped to form a toroid shape which is then cut in half to form a pair of stator or rotor U-shaped segments. Then, the U-shaped stator or rotor segments 12, however made, are molded into the shape of horseshoe shape conforming tightly around a motor pole, making half of two pole pieces, as shown in FIGS. 2A and 2C. The electrically insulating coating provided on the individual wires 10a and/or strips 10b can serve as a binder 14 for the molding operation. The insulating wire and/or strip coating can be applied by dip coating, solution coating, spray coating, or chemical/physical vapor deposition and can include, but is not limited to, at least one of a polymeric material such as epoxy resin, inorganic insulator material, and semiconductor material. A plurality of U-shape wire and/or strip bundle segments 12 then are bonded side-by-side radially into a cylinder forming the stator or rotor, as shown in FIGS. 2 and 2B.

EXAMPLE

The following Example is offered to further illustrate but limit embodiments of the present invention.

To obtain ductile high silicon steel (6.5 weight % Si, balance essentially Fe) wires or strips, the formation of ordered phases below about 600° C. needs to be suppressed. This can be done via rapidly cooling techniques such as melt spinning, where the molten metal is injected onto a rotating copper wheel. The melt spinning process directly produces continuous ductile high silicon steel wires, strips, ribbons, tapes, or bands. As mentioned hereabove, wires can have a circular or other cross-section, while a strip includes, but is not limited to, a ribbon, tape, band, or other similar elongated shape. Depending on the process parameter and equipment capability, melt spinning can produce a strip width typically from 0.5 mm to 220 mm.

For example, soft magnetic wires or more narrow strips are easily achievable using the melt spinning technique. FIG. 3a shows a collection of ductile high silicon steel strips (about 1 mm wide) prepared by melt spinning using 20 m/s wheel speed. A strip width (or wire diameter) can be in the range of 0.1 mm to 100 mm for use in practice of certain embodiments of the invention, although strips (or wires) having a width (diameter) between about 0.5 mm to about 60 mm as well as other width dimensions that are amenable to folding or otherwise forming to U-shape or other shape can be used. The soft magnetic strips (or wires)s can be size-reduced from precursor (larger size) soft magnetic material by appropriate processing including, but not limited to, cutting, rolling, pressing and others of the precursor soft magnetic material.

The as-rapidly solidified strips may be curly and kinked due to the limited solidification chamber size or other equipment parameters. Such strips can be straightened by light cold rolling, as shown in FIG. 3b, and can be easily truncated (e.g. cut) into the desired length as shown in FIG. 3c. In this example, the strips were mixed with epoxy resin by dip coating and then aligned in a die set. The epoxy resin polymer served as the insulating material for the strips as well as the binder 14 to gain structural integrity. The desired shape of the stator piece segment was maintained by cold pressing and curing of the strip/epoxy mixture in the cold pressing die. After curing, the epoxy bond wire bundle stator segment was ejected from the cold pressing die set. An illustrative high silicon steel strip epoxy bundle in the form of a rectangular prism (dimensions of 50 mm×20 mm×1 mm) was prepared and is shown in FIG. 4a. FIG. 4b shows two U shape stator segments, and FIG. 4c shows a toroid which was cut in half to form the two U-shape stator segments of FIG. 4b.

Referring to FIG. 5, when viewed in cross-section, the wire bundle or strip bundle design effectively minimizes eddy current loss (see arrows) due to small cross section size of wires 10a or strips 10b. When viewed in plan view, the wire or strip bundle design provides a magnetic flux path that is continuous in the wire and/or strip bundle core, minimizing air gaps. As discussed above, the SMM wire and/or strip bundles 10 can be bent or otherwise shaped to maximize the magnetic flux density, which is not possible in a conventional steel laminate design. Therefore, the wire bundle and/or strip bundle design can be a more efficient architecture for motor stator if the densification can be maximized.

Moreover, FIG. 6 includes a magnetic property table showing lower energy loss of Fe-6.5 w/o Si strip (ribbon) bundles in accordance with embodiments of the invention compared to that of a Fe-3.2 w/o Si sheet sample of commercial grain oriented silicon steel. (GOSi steel).

Embodiments of the present invention envision electromagnetic devices that include the above described wire and/or strip bundles to provide a particular required or desired 3D magnetic flux paths. Such electromagnetic devices include, but not limited to, electromagnet yoke and electromagnet pole piece. Because each individual wire and/or strip of a bundle acts as a magnetic flux carrier.

While preferred embodiments of the invention are exemplified above, modifications and variations can be made thereto without departing from the spirit and scope of the present invention as set forth in the appended claims.

References, which are incorporated herein by reference

[1]. Tangudu, J. et al., "Design, analysis and loss minimization of a fractional-slot concentrated winding IPM machine for traction applications." Energy Conversion Congress and Exposition (ECCE). IEEE, 2011.

[2]. G. Ouyang, X. Chen, Y. Liang, C. Macziewski, J. Cui, Review of Fe-6.5 wt % Si high silicon steel—A promising soft magnetic material for sub-kHz application, J. Magn. Magn. Mater. 481 (2019) 234-250.

We claim:

1. An electric motor stator or rotor comprising multiple segments each comprising a bundle of a plurality of individual wires and/or strips comprised of soft magnetic material wherein the multiple segments are disposed side-by-side to form a stator or rotor cylinder array, wherein the wires and/or strips of each bundle are shaped to provide a U-shaped bundle that comprises a relatively long first radially extending region and second radially extending region integral with a relatively short connecting region to form wire and/or strip magnetic flux pathways in each segment and wherein the first radially extending region and second radially extending region of respective neighboring segments of the stator or rotor array receive and share a coil winding to provide two wire coil windings for each stator or rotor segment.

2. The stator or rotor of claim 1 wherein side-by-side segments are joined together to form the complete stator or rotor cylinder array.

3. The stator or rotor of claim 1 wherein the wires and/or strips of each bundle are electrically insulated from one another.

4. The stator or rotor of claim 3 wherein each of the wires and/or strips of each bundle has an electrical insulating coating thereon.

5. The stator or rotor of claim 4 wherein the coating comprises at least one of a polymeric material, inorganic insulator material, or semiconductor material.

6. The stator or rotor of claim 1 wherein the bundles of wires and/or strips are U-shaped to provide magnetic flux pathways in each segment.

7. The stator or rotor of claim 1 wherein the wires and/or strips comprise rapidly solidified soft magnetic material.

8. The stator or rotor of claim 7 wherein the soft magnetic material comprises at least one of silicon steel material having a Si content greater than 3.2 weight %, amorphous soft magnetic material, or nanocrystalline soft magnetic material.

9. The stator or rotor of claim 8 wherein the silicon steel material, amorphous soft magnetic material, or nanocrystalline soft magnetic material is melt spun or otherwise rapidly solidified to to produce monolithic individual wires and/or strips.

10. The stator or rotor of claim 1 wherein the soft magnetic wires and/or strips are size reduced from larger size soft magnetic material.

11. An electric motor that includes a stator or rotor of claim 1.

12. The electric motor of claim 11 which comprises a radial flux motor or a hybrid radial-axial flux motor.

13. The electric motor of claim 11 which comprises a vehicle electric motor.

14. A stator or rotor segment comprising a bundle of a plurality of soft magnetic wires and/or strips that are shaped to provide desired magnetic flux pathways for a particular stator or rotor application wherein the soft magnetic wires and/or strips comprise rapidly solidified silicon steel having greater than 3.2 weight % Si content.

15. The segment of claim 14 wherein the bundle has a U-shape.

16. A component that includes a plurality of individual soft magnetic wires and/or strips bundled to provide magnetic flux pathways in the component wherein the soft magnetic wires and/or strips comprise rapidly solidified silicon steel having greater than 3.2 weight % Si content.

17. The component in claim 16 that comprises at least one of a motor rotor or stator, transformer core, power electronics component inductor or choke, or electromagnet component.

18. An electromagnetic device that includes the component of claim 16.

19. The component of claim 16 wherein the rapidly solidified silicon steel comprises 6.5 weight % Si.

* * * * *